US005176027A

United States Patent [19]

Umemoto

[11] Patent Number: 5,176,027

[45] Date of Patent: Jan. 5, 1993

[54] TROUBLE DIAGNOSIS DEVICE

[75] Inventor: Hideki Umemoto, Hyogo, Japan

[73] Assignee: Mitsubishi Denki K.K., Tokyo, Japan

[21] Appl. No.: 640,460

[22] Filed: Jan. 11, 1991

[30] Foreign Application Priority Data

Jan. 12, 1990 [JP] Japan .................................... 2-3373

[51] Int. Cl.5 .......................................... G01M 19/00

[52] U.S. Cl. ................................................ 73/118.1

[58] Field of Search ...................... 73/118.1; 324/73.1; 371/22.5

[56] References Cited

U.S. PATENT DOCUMENTS 4,336,495 6/1982 Hapke ............................ 324/158 T 4,743,841 5/1988 Takeuchi ........................ 324/158 T

FOREIGN PATENT DOCUMENTS 64-55605 3/1989 Japan .

*Primary Examiner*—Robert Raevis

*Attorney, Agent, or Firm*—Sughrue, Mion, Zinn, Macpeak & Seas

[57] ABSTRACT

Disclosed herein is a trouble diagnosis device for use in a motor vehicle includes a plurality of input units for inputting signals corresponding to various conditions, a plurality of display units provided respectively for the plurality of input units, for displaying the various conditions and an engine control unit which, when plural input units, which are normally not selected in combination, are actuated, enters a trouble diagnosis mode, and turns on the plurality of display units as a trouble diagnosis display. The device can perform the inputting and displaying of the trouble diagnosis mode with ordinary units and without particular units.

3 Claims, 1 Drawing Sheet

PRIOR ART
FIG. 1
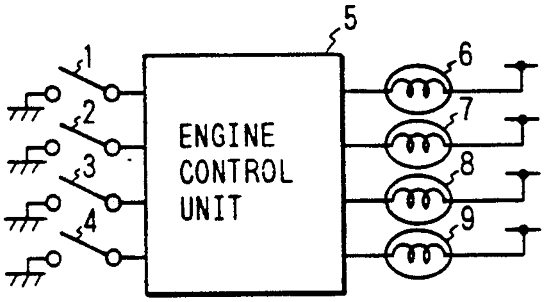
FIG. 2
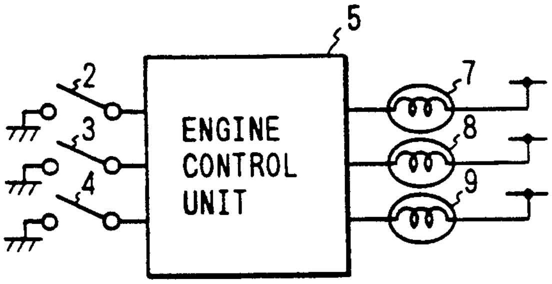
FIG. 3
| | | | | |
|---|---|---|---|---|
| OVER-HEAT SW | ON | OFF | OFF | ON |
| OIL LEVEL SW | OFF | ON | OFF | ON |
| IDLING SW | OFF | OFF | ON | ON |
| DISPLAY | OVER-HEAT | NO OIL | IDLING STATE | TROUBLE DIAGNOSIS |

TROUBLE DIAGNOSIS DEVICE

BACKGROUND OF THE INVENTION

The present invention relates to a device for diagnosing an engine such as an internal combustion engine to detect an occurrence of trouble therein (hereinafter referred to merely as a trouble diagnosis device).

The arrangement of a conventional trouble diagnosis device of this type will be described with reference to FIG. 1 showing a circuit diagram therefor. Published Unexamined Japanese Patent Application No. Sho. 64-55605 discloses an example of such a conventional trouble diagnosis device as shown in FIG. 1.

The conventional trouble diagnosis device, as shown in FIG. 1, includes: a trouble diagnosis input unit 1; an over-heat input unit 2; an oil level input unit 3; an idle input unit 4; an engine control unit 5 having a microcomputer connected to those units 1 through 4; a trouble diagnosis display unit 6; an over-heat display unit 7; an oil level display unit 8; and an idle display unit 9, these units 6 through 9 being connected to the engine control unit 5.

The operation of the conventional trouble diagnosis device thus organized will be described.

When the trouble diagnosis input unit 1 is turned on, the engine control unit 5 enters a trouble diagnosis mode and performs a trouble diagnosis operation. Then, the unit 5 starts the diagnosis operation to locate the failure and causes the trouble diagnosis display unit 6 to display the position of the failure.

The above-described conventional trouble diagnosis device is disadvantageous in that, due to the provision of such trouble diagnosis input unit and the trouble diagnosis display unit as described above, it is difficult to simplify or miniaturize the device, and therefore the device is relatively high in manufacturing cost.

SUMMARY OF THE INVENTION

Accordingly, an object of this invention is to eliminate the above-described difficulties accompanying a conventional trouble diagnosis device. More specifically, an object of the invention is to provide a trouble diagnosis device which can enter a trouble diagnosis mode and display the result of the diagnosis representing the location of a failure without providing a trouble diagnosis input unit and a trouble diagnosis display unit as provided in the conventional device.

The foregoing object of the invention has been achieved by providing a trouble diagnosis device which, according to the invention, comprises a plurality of input units for inputting signals corresponding to various conditions, a plurality of display units provided respectively for the plurality of input units, for displaying the various conditions and an engine control unit which, when plural input units which are not actuated in combination normally, are actuated simultaneously, determines that a trouble diagnosis mode has been entered to cause the corresponding display units to display the result of the diagnosis operation.

BRIEF DESCRIPTION OF THE DRAWINGS

In the accompanying drawings:

FIG. 1 is a circuit diagram showing a conventional trouble diagnosis device;

FIG. 2 is a circuit diagram showing an embodiment of the present invention;

FIG. 3 is an explanatory diagram for a description of the operation of the embodiment of the invention.

DESCRIPTION OF THE PREFERRED EMBODIMENT

The arrangement of one example of a trouble diagnosis device embodying this invention will be described with reference to FIG. 2 showing a circuit diagram therefor.

The trouble diagnosis device, as shown in FIG. 2, includes a plurality of input units such as an over-heat input unit 2, an oil level input unit 3 and an idle input unit 4, an engine control unit 5 connected to those input units 2, 3 and 4, a plurality of display units such as an over-heat display unit 7, an oil level display unit 8 and an idle display unit 9, these units 7, 8 and 9 being connected to the engine control unit 5.

The operation of the trouble diagnosis device thus organized will be described.

Normally, when one of the input units 2, 3 or 4 is turned on, the corresponding display unit 7, 8 or 9 is activated for its own display.

More specifically, for instance when the over-heat input unit 2 is turned on, then the engine control unit 5 causes the over-heat display unit 7 to light up if the engine is over-heated. Similarly when the oil level input unit 3 is turned on, the engine control unit 5 causes the oil level display unit 8 to light up if the oil level is not sufficient.

When a trouble diagnosis operation is to be performed, all the input units 2, 3 and 4 are turned on simultaneously as shown in FIG. 3. As a result, the engine control unit 5 enters a trouble diagnosis mode and causes the display units 7,8 and 9 to display the results of the trouble diagnosis operation. The locations of failures can be indicated by causing the display units 7, 8 and 9 to light up in combination (as code outputs). In this case, it should be noted that normally there is no case in which all the input units 2, 3 and 4 are turned on.

As described above, according to the present invention, there is no need to provide both an input and display units or keys to perform a diagnosis operation and display the result thereof. In other words, the trouble diagnosis device of the invention employs the existing input units and display units to perform the diagnosis operation and the trouble diagnosis display when the particular conditions are inputted, that is, when the unusual combination of input units are actuated. Therefore, the device can be simplified in construction, reduced in size, and decreased in manufacturing cost.

In the above-described embodiment, the over-heat input unit, the oil level input unit and the idle input unit are turned on to enter the trouble diagnosis mode, because normally all these units are not simultaneously selected in combination; however, the invention is not limited thereto or thereby. That is, other input units (not shown) may be added to those input units. In this case also, the inputting of the trouble diagnosis mode can be determined by turning on all of the input units or a plurality of input units in unusual combination.

What is claimed is:

1. A trouble diagnosis device comprising:

a plurality of input units which receive actuating signals respectively corresponding to the occurrence of one of a plurality of conditions wherein a combination of said conditions do not occur simultaneously;

a plurality of display units provided respectively for said plurality of input units for displaying said conditions; and a control unit for simultaneously actuating a combination of said input units, which correspond to said combination of said conditions which do not occur simultaneously, so that said trouble diagnosis device enters a trouble diagnosis mode to perform a trouble diagnosis operation, and display results of said trouble diagnosis operation on said plurality of display units.

2. A trouble diagnosis device as defined in claim 1 wherein said control unit is an engine control unit for use in a motor vehicle.

3. A trouble diagnosis device as defined in claim 2 wherein said input units operate to input level detections of over-heat, oil level and idling.

* * * * *